United States Patent
Sharma (10) Patent No.: US 10,341,117 B2
(45) Date of Patent: Jul. 2, 2019

(54) CLOUD AUTHENTICATION OF LAYER 2-CONNECTED MEMBER DEVICES VIA AN IP-CONNECTED ACTIVE DEVICE

(71) Applicant: Brocade Communications Systems, Inc., San Jose, CA (US)

(72) Inventor: Suman Sharma, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 125 days.

(21) Appl. No.: 15/653,104

(22) Filed: Jul. 18, 2017

(65) Prior Publication Data

US 2018/0183604 A1 Jun. 28, 2018

Related U.S. Application Data

(60) Provisional application No. 62/438,413, filed on Dec. 22, 2016.

(51) Int. Cl.
| | |
|---|---|
| *H04L 9/32* | (2006.01) |
| *H04L 9/14* | (2006.01) |
| *H04L 9/30* | (2006.01) |
| *G06F 21/00* | (2013.01) |

(52) U.S. Cl.
CPC ............. *H04L 9/3247* (2013.01); *H04L 9/14* (2013.01); *H04L 9/30* (2013.01); *H04L 9/321* (2013.01)

(58) Field of Classification Search
None
See application file for complete search history.

(56) References Cited

U.S. PATENT DOCUMENTS

| | | | | |
|---|---|---|---|---|
| 2003/0163692 A1* | 8/2003 | Kleinsteiber | ........... | H04L 63/08 713/169 |
| 2013/0276090 A1* | 10/2013 | Kopti | .................... | H04W 88/16 726/11 |
| 2015/0229638 A1* | 8/2015 | Loo | ........................ | H04L 63/029 726/9 |
| 2016/0036790 A1* | 2/2016 | Shastry | ............... | H04L 63/0435 713/168 |

\* cited by examiner

*Primary Examiner* — Gary S Gracia
(74) *Attorney, Agent, or Firm* — Fountainhead Law Group P.C.

(57) ABSTRACT

Techniques for enabling cloud authentication of Layer 2-connected member devices via an IP-connected active device are provided. In one set of embodiments, the member device can transmit, to the active device, a request to authenticate the member device with a cloud management platform. The member device can further receive, from the active device, an encrypted nonce generated by the cloud management platform in response to the request, where the encrypted nonce is encrypted using a public key of the member device. The member device can decrypt the encrypted nonce using a private key of the member device to generate a decrypted nonce and can transmit the decrypted nonce to the active device. The member device can then receive, from the active device, a token generated by the cloud management platform indicating that the member device has been authenticated by the platform.

18 Claims, 6 Drawing Sheets

CLOUD AUTHENTICATION OF LAYER 2-CONNECTED MEMBER DEVICES VIA AN IP-CONNECTED ACTIVE DEVICE

CROSS-REFERENCES TO RELATED APPLICATIONS

The present application claims the benefit and priority of U.S. Provisional Patent Application No. 62/438,413, filed Dec. 22, 2016, entitled "CLOUD AUTHENTICATION OF LAYER 2-CONNECTED MEMBER DEVICES VIA AN IP-CONNECTED ACTIVE DEVICE." The entire contents of this provisional application are incorporated herein by reference for all purposes.

BACKGROUND

In recent years, it has become increasingly common for enterprises and organizations to make use of a cloud-based management platform for managing their networks. Examples of such platforms include the Meraki platform developed by Cisco Systems and the Smart Access Management Service (SAMS) developed by Ruckus Wireless (now part of Brocade Communications Systems, Inc.). Among other things, a cloud-based management platform enables centralized authentication and authorization of the network devices (e.g., switches, routers, wireless access points, etc.) operating on the network.

In cases where a given network device has IP (Internet Protocol) connectivity to the cloud, the network device can directly communicate with the cloud-based management platform in order to be authenticated and/or authorized by the platform. However, some network devices (such as, e.g., the member switches in a stacking system) may not have direct IP connectivity to the cloud. For these devices, different techniques are needed in order to support cloud-based authentication/authorization.

SUMMARY

Techniques for enabling cloud authentication of Layer 2-connected member devices via an IP-connected active device are provided. In one set of embodiments, the member device can transmit, to the active device, a request to authenticate the member device with a cloud management platform. The member device can further receive, from the active device, an encrypted nonce generated by the cloud management platform in response to the request, where the encrypted nonce is encrypted using a public key of the member device. The member device can decrypt the encrypted nonce using a private key of the member device to generate a decrypted nonce and can transmit the decrypted nonce to the active device. The member device can then receive, from the active device, a token generated by the cloud management platform indicating that the member device has been authenticated by the platform.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that enable a network device that does not have IP (i.e., Layer 3) connectivity to a cloud-based management platform to nevertheless communicate with, and be authenticated and/or authorized by, that platform via an intermediate IP-connected device. For example, consider a network stacking system that comprises an "active" (also known as "master") switch and a number of member switches. In such a system, the member switches will typically only have Layer 2 connectivity to the active switch, while the active switch will typically have IP connectivity to one or more wide area networks such as the Internet.

In the foregoing and other similar scenarios, with the techniques described herein, each member switch (referred to as a "Layer 2-connected member device") can engage in a cryptography-based message exchange with the cloud-based management platform via the active switch (referred to as an "IP-connected active device"). Through this message exchange, the cloud-based management platform can verify the identity of the Layer 2-connected member device and thereby authenticate/authorize the member device, despite the lack of direct IP connectivity between these two entities.

Further, as part of the authentication/authorization process, in certain embodiments the cloud-based management platform can provide the Layer 2-connected member device with a self-verifiable token (SVT). Using this SVT, the active device can independently re-authenticate and/or re-authorize the member device on an as-needed basis, without having to communicate again with the cloud management platform. These and other aspects of the present disclosure are described in further detail below.

2. System Environment

Figure 1:
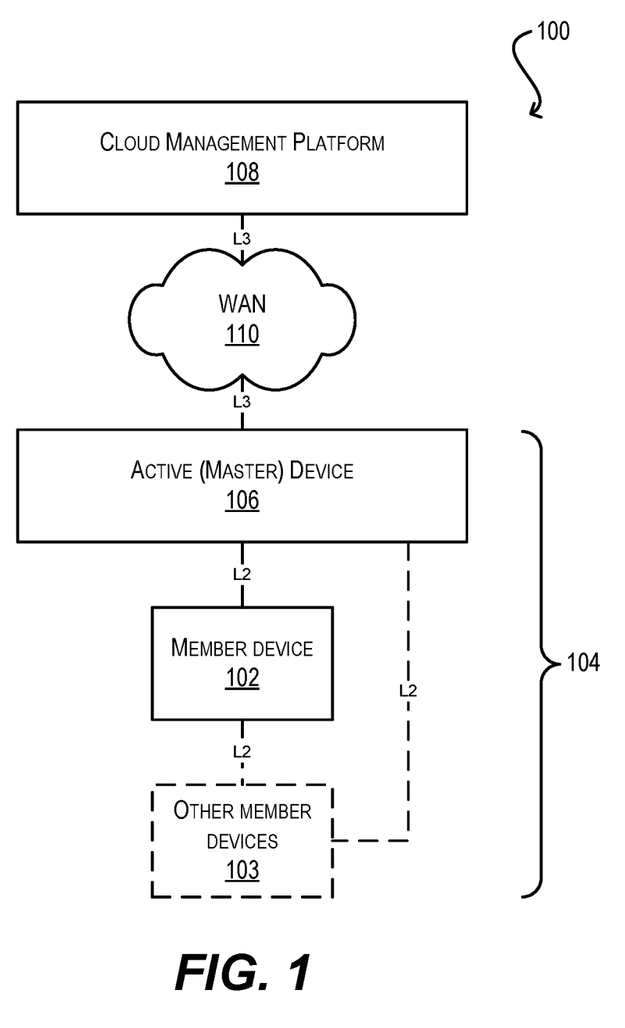
FIG. 1 depicts a system environment according to an embodiment.

FIG. 1 depicts a system environment 100 in which embodiments of the present disclosure may be implemented. As shown, system environment 100 includes a network device 102 (referred to as a "member device") that is part of a networking system 104 and is connected, via Layer 2, to a master, or "active" device 106 of system 104. For example, in one set of embodiments, networking system 104 can be a stacking system and member/active devices 102/106 can be respective member/active switches in the stacking system.

In the configuration depicted, member device 102 does not have IP connectivity to any external networks; instead, member device 102 can only communicate with the other network devices within networking system 104 (i.e., other member devices 103 and active device 106) via Layer 2 messages. On the other hand, active device 106 (which is typically an L2/L3 switch/router) has a routable IP address and can communicate, via Layer 3, to a cloud management platform 108 via a wide-area network 110 (e.g., the Internet). Cloud management platform 108 can comprise, e.g., one or more servers that are designed to configure and manage the operation of networking system 104 and other connected devices/systems/networks.

As noted in the Background section, prior art techniques for performing centralized, cloud-based authentication and authorization of network devices generally require each device to have direct IP connectivity to the cloud management platform (i.e., platform 108) in order to carry out the authentication/authorization. In the case of networking system 104 of FIG. 1, this requirement is not an issue for active device 106, which has Layer 3 connectivity with cloud management platform 108. However, this requirement is problematic for member device 102, which only has Layer 2 connectivity to the other devices in networking system 104 and thus has no direct Layer 3 connectivity with cloud management platform 108.

To address this and other similar issues, in various embodiments member device 102 and cloud management platform 108 can engage in a cryptography-based message exchange that uses active device 106 as an intermediary. In other words, member device 102 can communicate with active device 106 via Layer 2 messages/packets, which in turn can communicate with cloud management platform 10 via Layer 3 messages/packets. Through this message exchange, cloud management platform 108 can verify the identity of member device 102 and thereby authenticate/authorize member device 102 for operation within networking system 104.

Further, upon authenticating/authorizing member device 102, in certain embodiments cloud management platform 108 can provide an SVT to member device 102/active device 106 which active device 106 can subsequently use to re-authenticate and/or re-authorize member device 102, without have to re-execute the original message exchange with cloud management platform 108. Thus, this SVT can advantageously shorten the time needed for re-authentication/re-authorization, and also ensures that the re-authentication/re-authorization can be successfully performed in scenarios where active device 106 loses IP connectivity with cloud management platform 108 (due to, e.g., a network failure or other issue). The specific workflows that can be carried out by member device 102, active device 106, and cloud management platform 108 in order to implement these features are described in the sections that follow.

It should be appreciated that system environment 100 of FIG. 1 is illustrative and not intended to limit embodiments of the present disclosure. For example, the various entities shown in system environment 100 may be arranged according to different configurations, and/or may include sub-components or functions not specifically described. One of ordinary skill in the art will recognize other variations, modifications, and alternatives.

2. Initial Authentication/Authorization Workflow

Figure 2A:
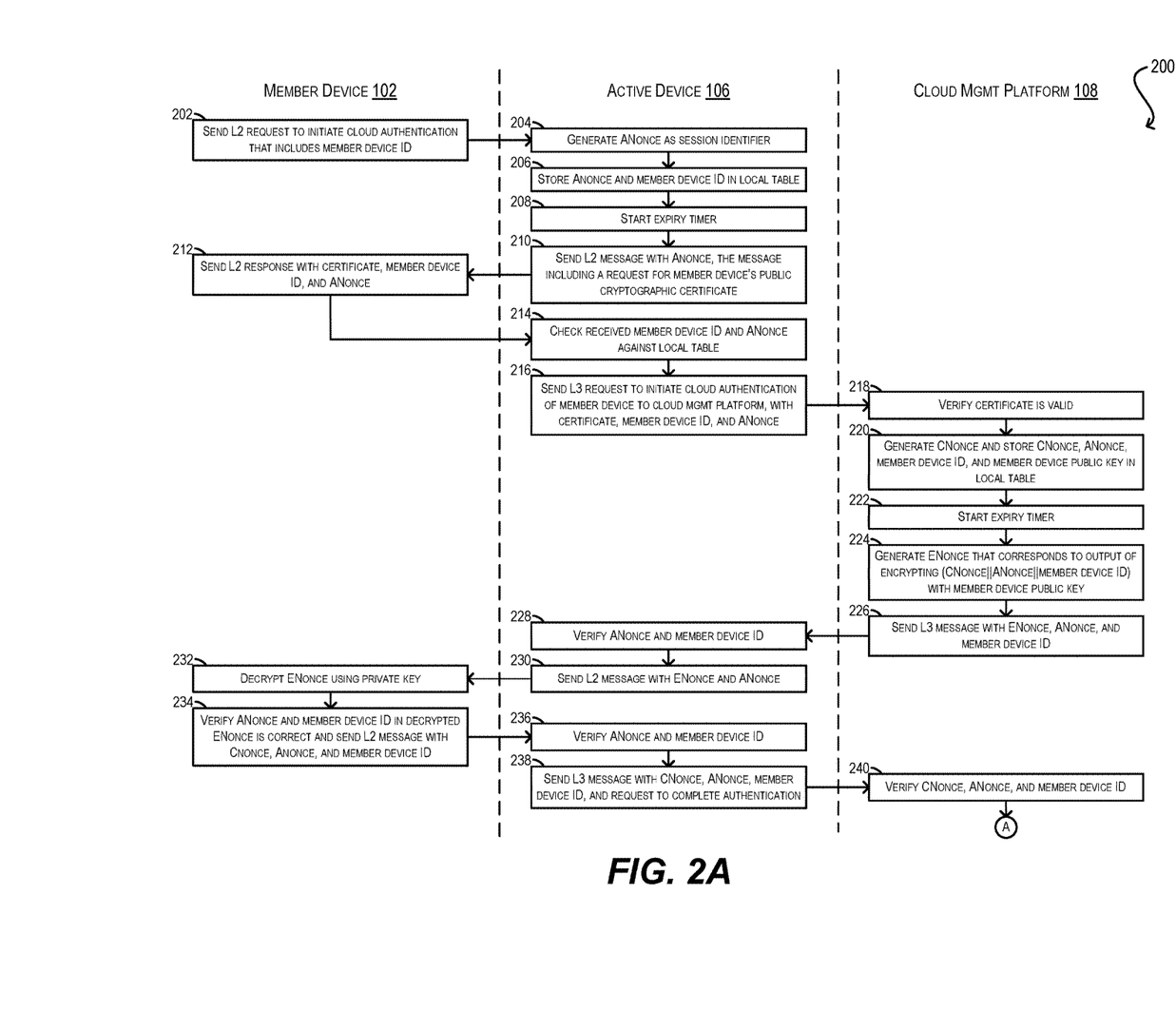
FIGS. 2A and 2B depict an initial authentication/authorization workflow that may be carried out between a Layer 2-connected member device, an IP-connected active device, and a cloud management platform according to one embodiment.
Figure 2B:
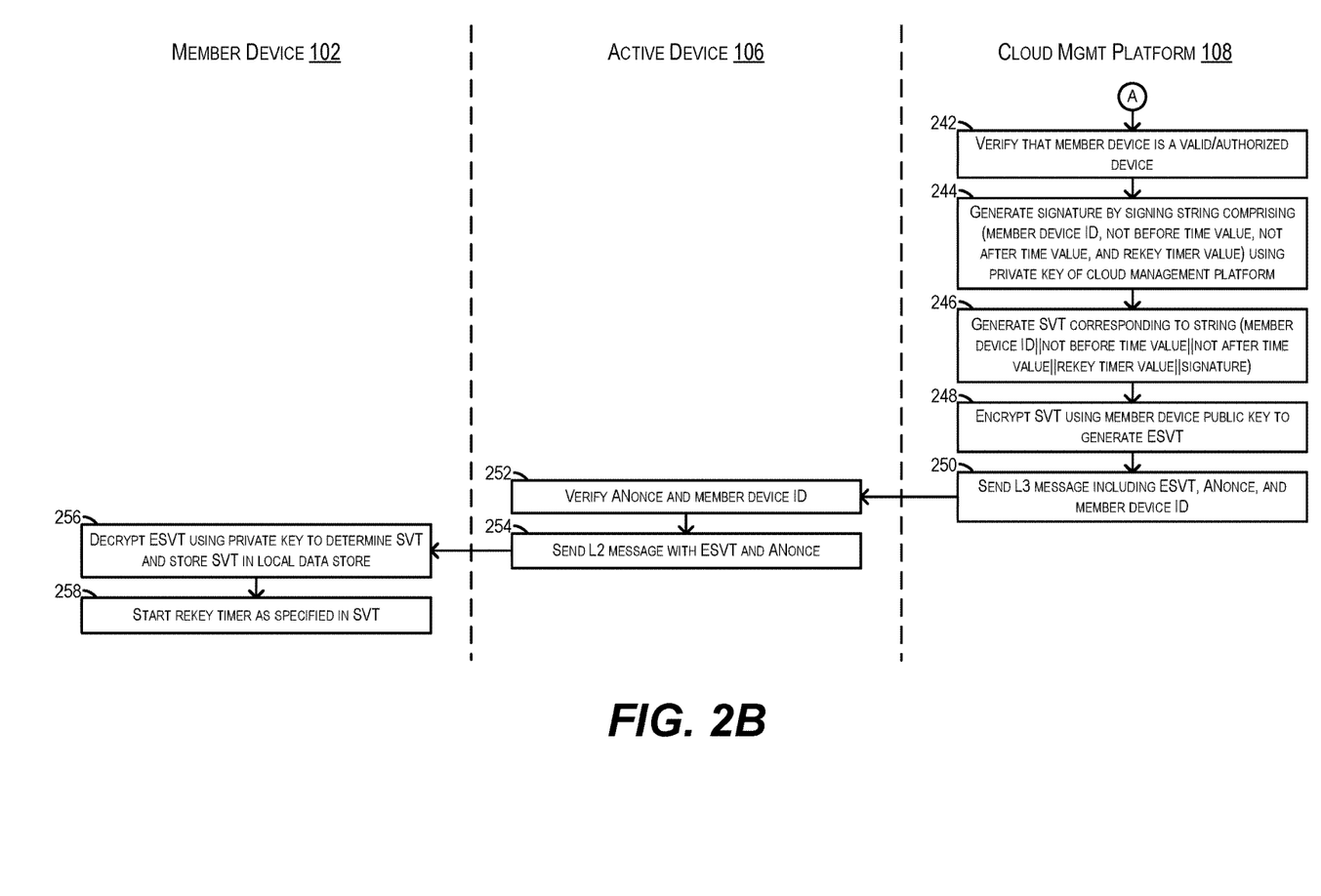

FIGS. 2A and 2B depict a workflow 200 that may be carried out by member device 102, active device 106, and cloud management platform 108 of FIG. 1 for initially authenticating and/or authorizing member device 102 with platform 108 according to an embodiment. Workflow 200 assumes that active device 106 has an IP connection with cloud management platform 108, whereas member device 102 only has a Layer 2 connection with active device 106. Thus, member device 102 can only communicate with active device 106 via a Layer 2 messaging mechanism (note that the particular implementation/format of this mechanism is not important for the purposes of the present disclosure and any standard or proprietary Layer 2 message format can be used).

Starting with block 202, member device 102 can send to active device 106 a Layer 2 message comprising a request to initiate an authentication/authorization process with cloud management platform 108 and an identifier (e.g., serial number) of the member device. In response, active device 106 can generate a nonce (i.e., an arbitrary number used only once in a given cryptographic workflow, referred to here as "ANonce") as a session identifier (block 204), store ANonce and the member device identifier in a local table (block 206), start an expiry timer (for, e.g., 5 minutes) (block 208), and send a Layer 2 message back to the member device with a request for the member device's public cryptographic certificate (e.g., PKI certificate) and with the generated ANonce (block 210). Note that the purpose of starting the expiry timer at block 208 is to avoid holding the ANonce and the member device identifier in the local table for an indefinite amount of time, and thus guard against denial-of-service (DOS) attacks. If no response is received from member device 102 within the timer interval, active device 106 can delete the ANonce and the member device identifier from its local table.

At block 212, it is assumed that member device 102 does send back a response message with its public cryptographic certificate, identifier, and the ANonce within the time interval. Upon receiving this message, active device 106 can cross-check the identifier and ANonce against its local table (to verify that it was previously stored there) (block 214), and then transmit, via a secure Layer 3 protocol such as HTTPS, a request to initiate remote authentication of member device 102 to cloud management platform 108 (block 216). As part of this request, active device 106 can include the member device's public cryptographic certificate, the member device's identifier, and the ANonce.

At block 218, cloud management platform 108 can verify that the member device's public cryptographic certificate is valid (i.e., is signed by a trusted certificate authority (CA) and is not expired or revoked). Assuming the certificate is valid, cloud management platform 108 can generate another nonce (referred to as "CNonce"), and store the CNonce, the ANonce, the member device's identifier, and a public key of the member device (included in the certificate) in a local table (block 220). Cloud management platform 108 can further start another expiry timer (for, e.g., 5 minutes) (block 222) and can generate an "ENonce" that corresponds to the output of encrypting the string "CNonce||ANonce||member device identifier" with the member device's public key (block 224).

At block 226, cloud management platform 108 can send a Layer 3 (e.g., HTTPS) response comprising the ENonce and the ANonce to active device 106. In response, active device 106 can verify the ANonce and member device identifier and, assuming this verification is successful, forward the ENonce and the ANonce, in the form of a Layer 2 message, back to member device 102 (blocks 228 and 230).

At block 232, member device 102 can decrypt the ENonce using its private key and thereby retrieve the string (CNonce||ANonce||member device identifier). Member device 102 can then verify that the ANonce and identifier are correct and transmit a Layer 2 message to the active device with the CNonce and the ANonce (block 234).

At blocks 236 and 238, active device 106 can verify the ANonce and member device identifier and subsequently transmit a secure Layer 3 message to cloud management platform 108 comprising a request to finish the authentication of member device 102. This request can include the CNonce, the ANonce, and the member device identifier.

In response, cloud management platform 108 can verify the CNonce, ANonce, and member device identifier, determine if member device 102 (as identified by its member device identifier) is a valid/authorized device, and if so, can generate a signature for a string comprising [member device identifier, a "not before time" value, a "not after time" value, and a "rekey" timer value] that is signed using a private key of platform 108 (blocks 240-244). Further, cloud management platform 108 can generate an SVT (self-verifiable token) comprising the string (member device identifier||not before time value||not after time value||rekey timer value||signature), and can encrypt the SVT using member device 102's public key to generate an encrypted SVT (ESVT) (blocks 246 and 248). Note that the not before time value indicates a time before which the SVT is not valid, the not after time value indicates a time after which the SVT is not valid, and the rekey timer value indicates a time period after which the member device to which the SVT applies needs to be re-authenticated/re-authorized.

At block 250, cloud management platform 108 can send a secure Layer 3 message to active device 106 with the ESVT, ANonce, and member device identifier. Upon verifying the ANonce and identifier (block 252), active device 106 can forward the ESVT and ANonce to member device 102 as a Layer 2 message (step 254).

Finally, at blocks 256 and 258, member device 102 can decrypt the ESVT using its private key to extract the SVT, store the SVT, and start a rekey timer as specified in the SVT. At this point, member device 102 is considered authenticated/authorized with cloud management platform 108 and can operate as per its normal operation.

3. Re-Authentication/Re-Authorization Workflow

Figure 3:
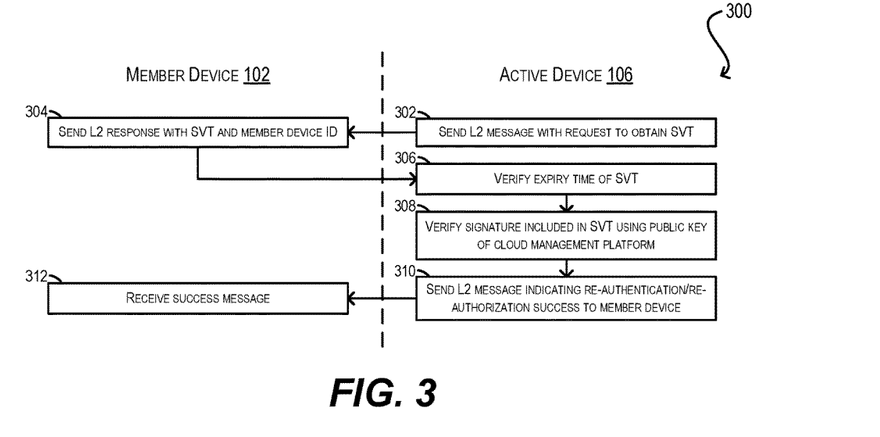
FIG. 3 depicts a re-authentication/re-authorization workflow that may be carried out between the Layer 2-connected member device and the IP-connected active device according to one embodiment.

FIG. 3 depicts a workflow 300 that may be executed by member device 102 and active device 106) in order to re-authenticate and/or re-authorize member device 102 some period of time after workflow 200 of FIG. 2. For example, workflow 300 may be executed when the rekey timer has expired. Workflow 300 may also be executed whenever active device 106 needs to recheck the authentication/authorization status of member device 102 (for example, in order to enable certain functionality on the member device). Significantly, with the SVT provided by cloud management platform 108, devices 102/106 can carry out this re-authentication/re-authorization without having to communicate again with cloud management platform 108.

Starting with block 302, active device 106 can send a Layer 2 message to member device 102 with a request to get the member device's SVT. In response, member device 102 can send a message with the SVT and the member device's identifier (block 304).

At blocks 306 and 308, active device 106 can verify the expiry time of the SVT received from member device 102 and verify the signature included in the SVT using the public key of cloud management platform 108 (which may be cached on the active device). In one set of embodiments, the verification at block 308 can comprise decrypting the signature using the cloud management platform public key and determining whether the member device identifier included in the decrypted signature matches the member device identifier received from member device 102 at block 304. Finally, assuming these verifications are successful, active device 106 can return an authentication/authorization success message to member device 102 (blocks 310 and 312). Note that since the SVT verification is performed entirely on active device 106, there is no need for active device 106 to communicate with cloud management platform 108 to carry out this process. Thus, the verification of the member device's authentication/authorization status can be performed even if the active device has lost communication with the cloud management platform.

4. Example Network Switch/Router

Figure 4:
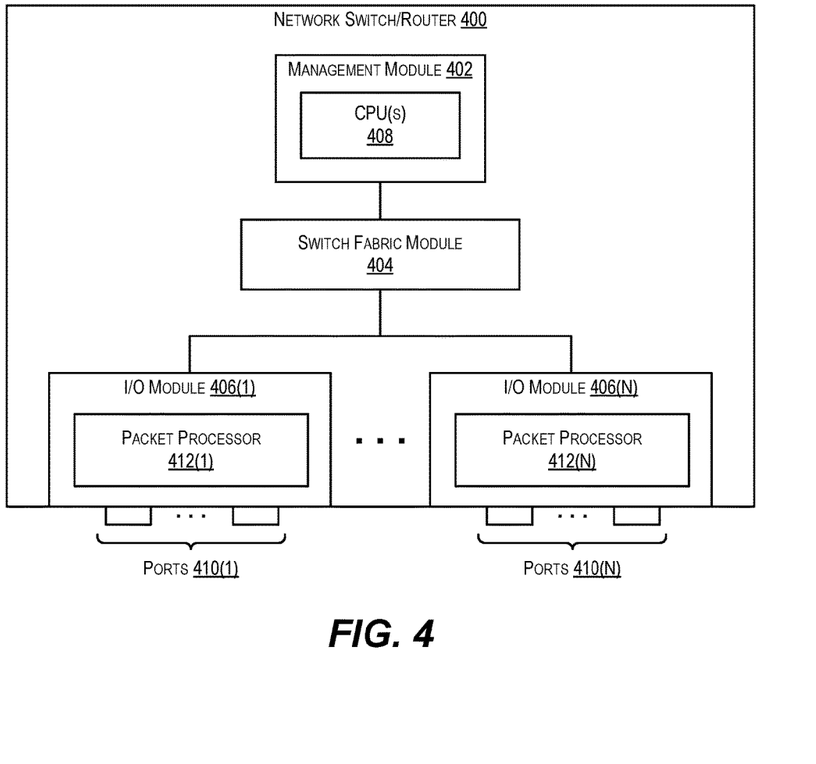
FIG. 4 depicts an example network switch according to one embodiment.

FIG. 4 depicts an example network switch/router 400 according to an embodiment. Network switch/router 400 can be used to implement, e.g., member device 102 or active device 106 described in the foregoing sections.

As shown, network switch/router 400 includes a management module 402, a switch fabric module 404, and a number of I/O modules 406(1)-406(N). Management module 402 includes one or more management CPUs 408 for managing/controlling the operation of the device. Each management CPU 408 can be a general purpose processor, such as a PowerPC, Intel, AMD, or ARM-based processor, that operates under the control of software stored in an associated memory (not shown).

Switch fabric module 404 and I/O modules 406(1)-406(N) collectively represent the data, or forwarding, plane of network switch/router 400. Switch fabric module 404 is configured to interconnect the various other modules of network switch/router 400. Each I/O module 406(1)-406(N) can include one or more input/output ports 410(1)-410(N) that are used by network switch/router 400 to send and receive data packets. Each I/O module 406(1)-406(N) can also include a packet processor 412(1)-412(N). Packet processor 412(1)-412(N) is a hardware processing component (e.g., an FPGA or ASIC) that can make wire speed decisions on how to handle incoming or outgoing data packets.

It should be appreciated that network switch/router 400 is illustrative and not intended to limit embodiments of the present disclosure. Many other configurations having more or fewer components than switch/router 400 are possible.

5. Example Computer System

Figure 5:
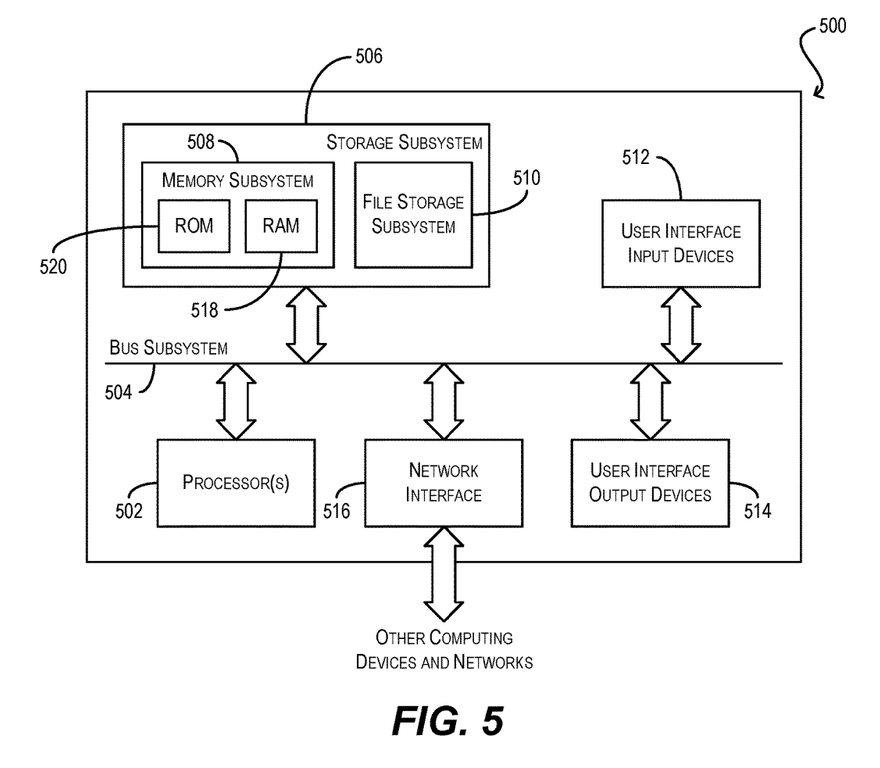
FIG. 5 depicts an example computer system according to one embodiment.

FIG. 5 depicts an example computer system 500 according to an embodiment. Computer system 500 can be used to implement, either wholly or in part, cloud management platform 108 of FIG. 1.

As shown in FIG. 5, computer system 500 can include one or more general purpose processors (e.g., CPUs) 502 that communicate with a number of peripheral devices via a bus subsystem 504. These peripheral devices can include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple buses.

Network interface subsystem 516 can serve as an interface for communicating data between computer system 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

User interface input devices 512 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 500.

User interface output devices 514 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 can include a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., nonvolatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and not intended to limit embodiments of the present disclosure. Many other configurations having more or fewer components than computer system 500 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   transmitting, by a first network device to a second network device, a request to authenticate the first network device with a cloud management platform, wherein the first network device is connected to the second network device via a Layer 2 connection, and wherein the second network device is connected to the cloud management platform via an IP (Internet Protocol) connection;
   receiving, by the first network device from the second network device, an encrypted nonce generated by the cloud management platform in response to the request, the encrypted nonce being encrypted using a public key of the first network device;
   decrypting, by the first network device, the encrypted nonce using a private key of the first network device to generate a decrypted nonce;
   transmitting, by the first network device, the decrypted nonce to the second network device; and
   receiving, by the first network device from the second network device, a token generated by the cloud management platform indicating that the first network device has been authenticated, wherein the first network device is a member switch in a stacking system and wherein the second network device is an active or master switch in the stacking system.

2. The method of claim 1 wherein the first network device does not have IP connectivity to the cloud management platform.

3. The method of claim 1 wherein the token includes an identifier of the first network device, a timer value, and an electronic signature created via a public key of the cloud management platform.

4. The method of claim 3 wherein the timer value indicates a time period over which the authentication of the first network device is valid.

5. The method of claim 3 further comprising:
   initiating a timer in accordance with the timer value; and
   upon expiration of the timer, transmitting the token to the second network device.

6. The method of claim 5 wherein, upon receiving the token, the second 2 network device is configured to:
   decrypt the electronic signature included in the SVT using a public key of the cloud management platform, the decrypted electronic signature including an identifier of the first network device;
   determining whether the identifier included in the decrypted electronic signature is correct; and
   if the identifier is correct, transmitting a message to the first network device indicating that the first network device has been re-authenticated.

7. A non-transitory computer-readable storage medium having stored therein instructions executable by a first network device, the instructions causing the first network device to:
   transmit, to a second network device, a request to authenticate the first network device with a cloud management platform, wherein the first network device is connected to the second network device via a Layer 2 connection, and wherein the second network device is connected to the cloud management platform via an IP (Internet Protocol) connection;
   receive, from the second network device, an encrypted nonce generated by the cloud management platform in response to the request, the encrypted nonce being encrypted using a public key of the first network device;
   decrypt the encrypted nonce using a private key of the first network device to generate a decrypted nonce;
   transmit the decrypted nonce to the second network device; and
   receive, from the second network device, a token generated by the cloud management platform indicating that the first network device has been authenticated, wherein the first network device is a member switch in a stacking system and wherein the second network device is an active or master switch in the stacking system.

8. The non-transitory computer-readable storage medium of claim 7 wherein 2 the first network device does not have IP connectivity to the cloud management platform.

9. The non-transitory computer-readable storage medium of claim 7 wherein 2 the token includes an identifier of the first network device, a timer value, and an electronic signature created via a public key of the cloud management platform.

10. The non-transitory computer-readable storage medium of claim 9 wherein the timer value indicates a time period over which the authentication of the first network device is valid.

11. The non-transitory computer-readable storage medium of claim 9 wherein the instructions further cause the first network device to: initiate a timer in accordance with the timer value; and upon expiration of the timer, transmit the token to the second network device.

12. The non-transitory computer-readable storage medium of claim 11 wherein, upon receiving the token, the second network device is configured to: decrypt the electronic signature included in the SVT using a public key of the cloud management platform, the decrypted electronic signature including an identifier of the first network device; determine whether the identifier included in the decrypted electronic signature is correct; and if the identifier is correct, transmit a message to the first network device indicating that the first network device has been re-authenticated.

13. A network device comprising:

a processor; and a memory having stored therein program code that, when executed, causes the processor to:

transmit, to another network device, a request to authenticate the network 6 device with a cloud management platform, wherein the network device is connected to said 7 another network device via a Layer 2 connection, and wherein said another network device is 8 connected to the cloud management platform via an IP (Internet Protocol) connection;

receive, from said another network device, an encrypted nonce generated by the cloud management platform in response to the request, the encrypted nonce being encrypted using a public key of the network device;

decrypt the encrypted nonce using a private key of the network device to generate a decrypted nonce;

transmit the decrypted nonce to said another network device; and receive, from said another network device, a token generated by the cloud management platform indicating that the network device has been authenticated, wherein the network device is a member switch in a stacking system and wherein the said another network device is an active or master switch in the stacking system.

14. The network device of claim 13 wherein the network device does not have IP connectivity to the cloud management platform.

15. The network device of claim 13 wherein the token includes an identifier of the network device, a timer value, and an electronic signature created via a public key of the cloud management platform.

16. The network device of claim 15 wherein the timer value indicates a time period over which the authentication of the network device is valid.

17. The network device of claim 15 wherein the program code further causes the processor to: initiate a timer in accordance with the timer value; and upon expiration of the timer, transmit the token to said another network device.

18. The network device of claim 17 wherein, upon receiving the token, said another network device is configured to: decrypt the electronic signature included in the SVT using a public key of the cloud management platform, the decrypted electronic signature including an identifier of the network device; determine whether the identifier included in the decrypted electronic signature is 7 correct; and 8 if the identifier is correct, transmit a message to the network device indicating that 9 the network device has been re-authenticated.

* * * * *